R. HERMAN.
SUPPORTING MEANS FOR TRANSMISSION MECHANISM.
APPLICATION FILED JAN. 9, 1911.
1,064,213.
Patented June 10, 1913.
5 SHEETS—SHEET 4.
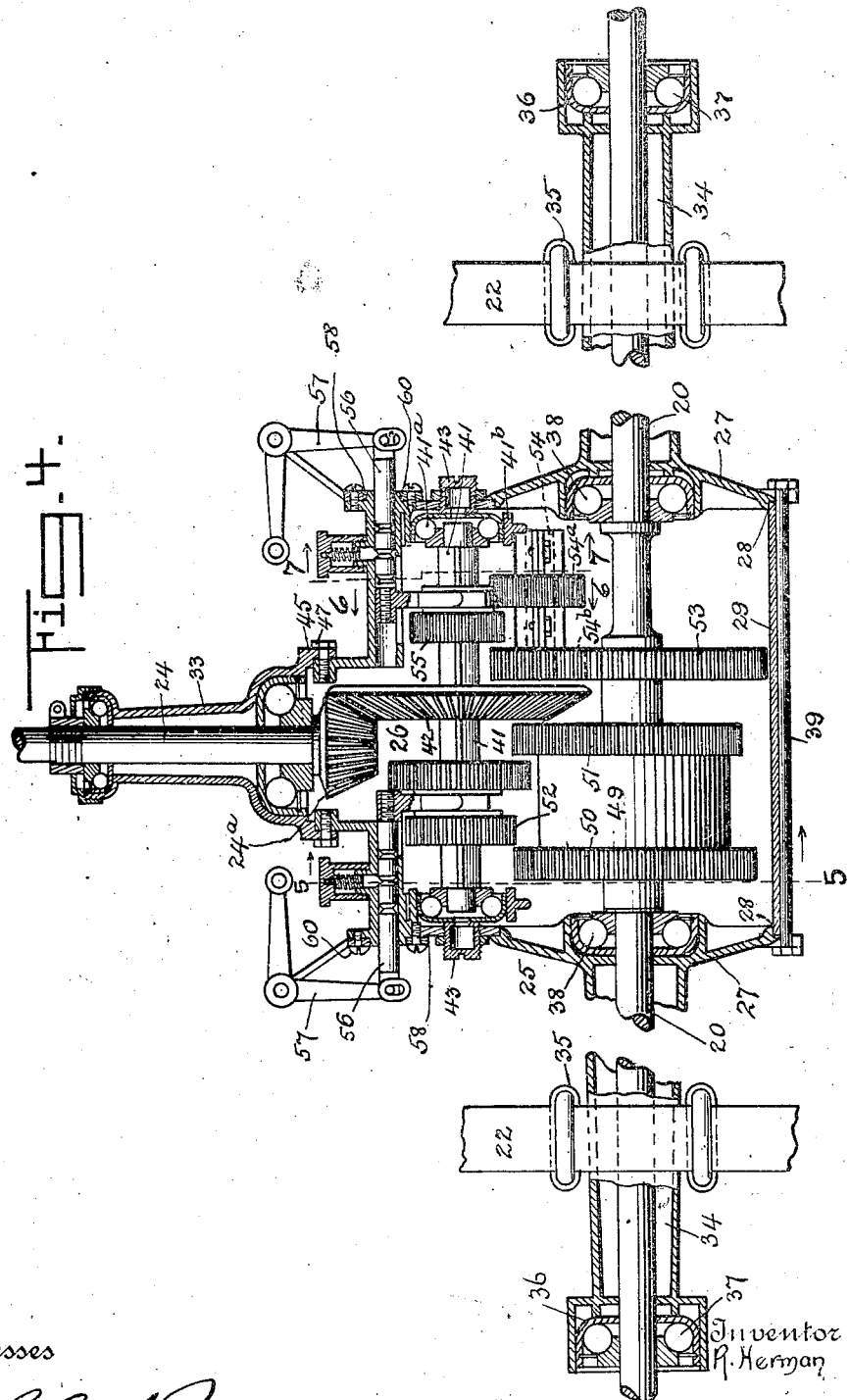
Witnesses
L. Cloud Newman.
Horace G. Deitz
Inventor
R. Herman
By A. M. Wilson
Attorney R. HERMAN.
SUPPORTING MEANS FOR TRANSMISSION MECHANISM.
APPLICATION FILED JAN. 9, 1911.
1,064,213.
Patented June 10, 1913.
5 SHEETS—SHEET 5.
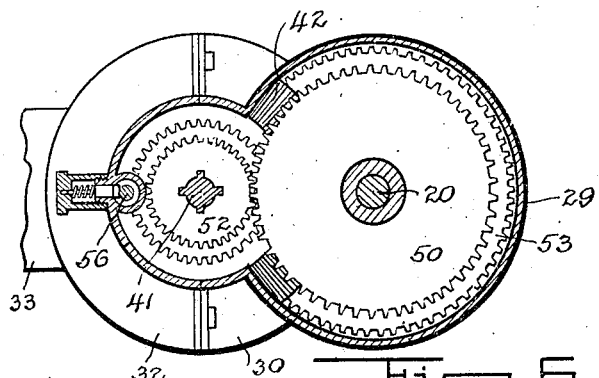
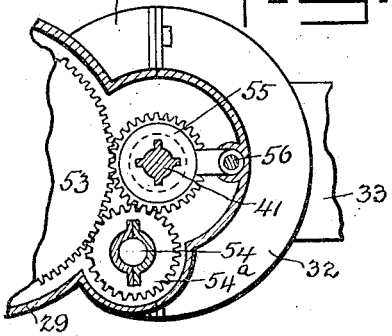
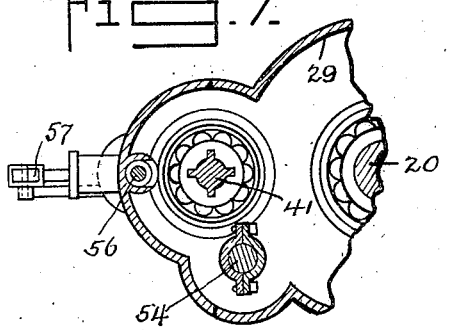
Witnesses
L. Cloud Newman.
Horace G. Deitz.
Inventor
Reinhold Herman
by A. M. Wilson
Attorney

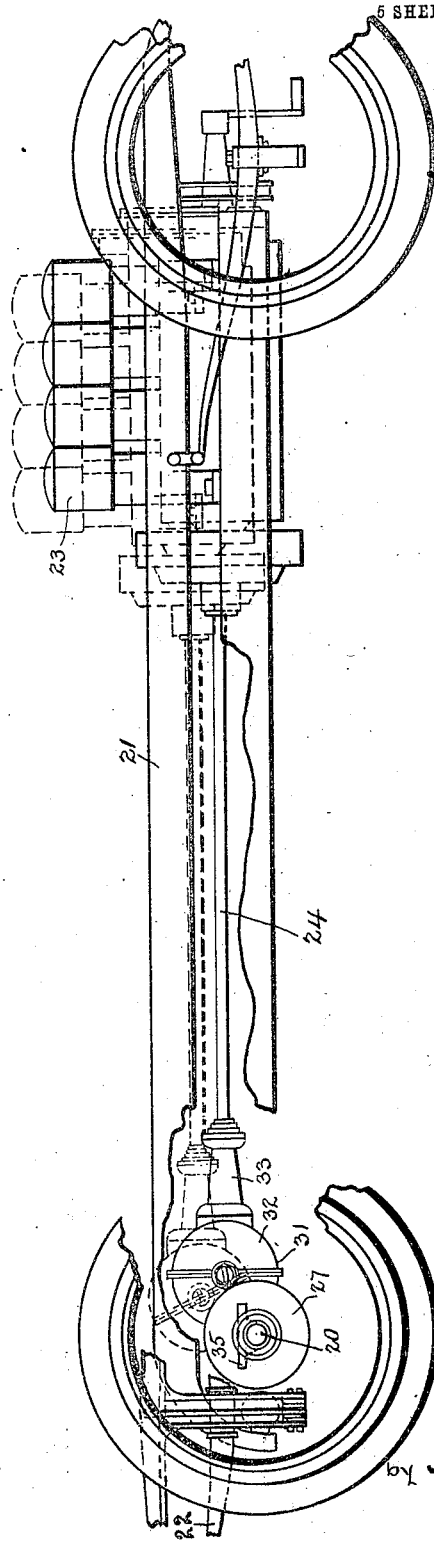

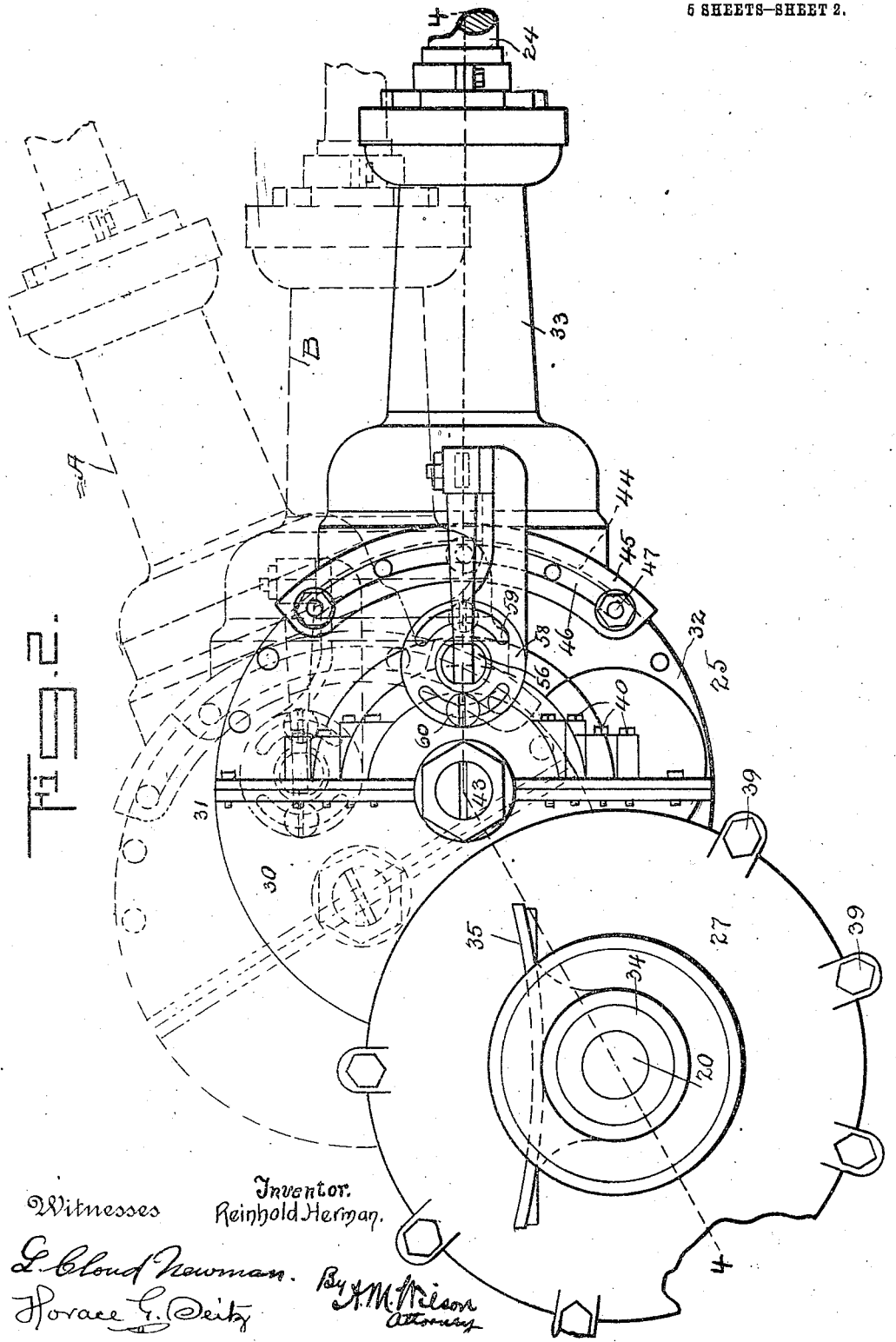

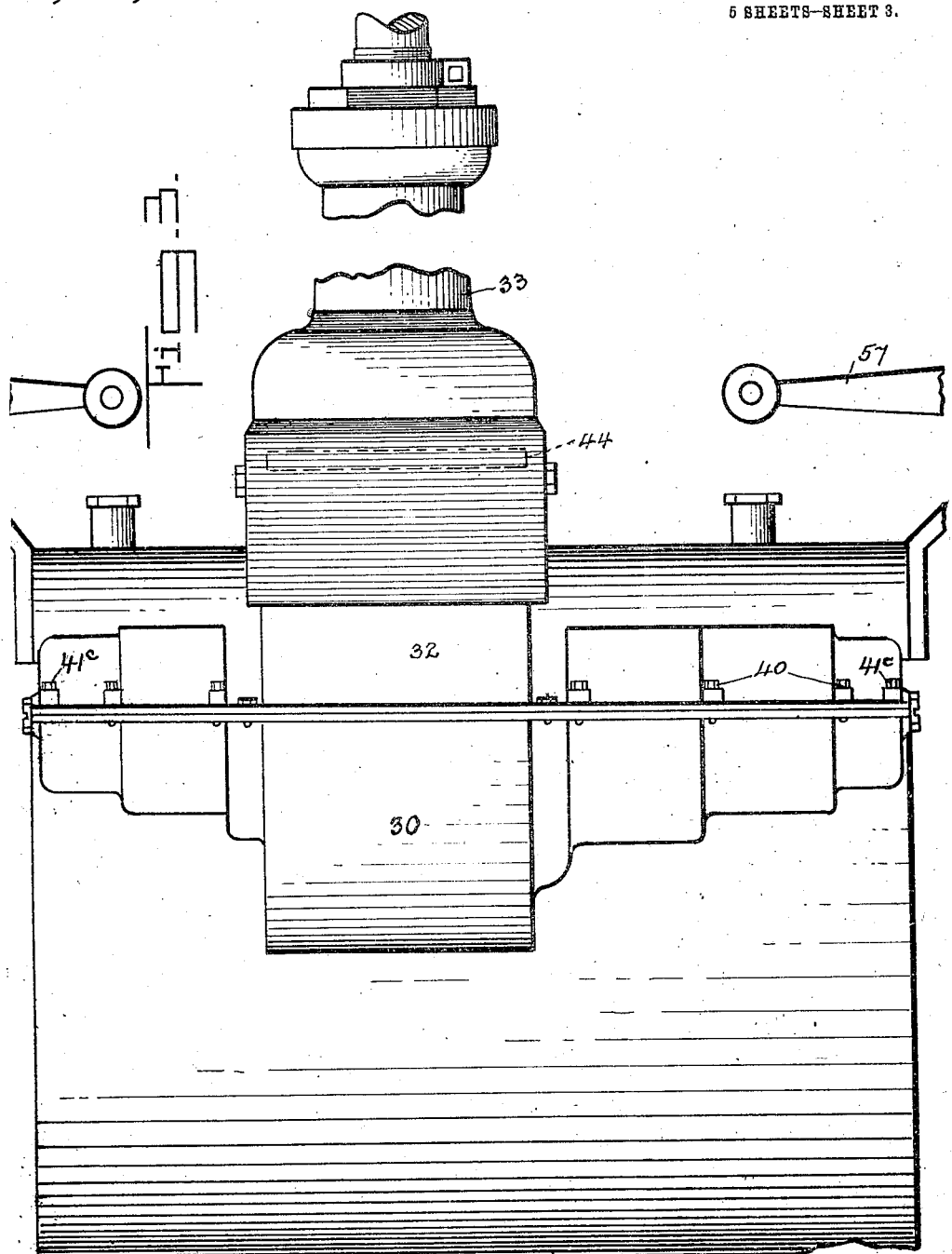

UNITED STATES PATENT OFFICE.

REINHOLD HERMAN, OF CRAFTON, PENNSYLVANIA.

SUPPORTING MEANS FOR TRANSMISSION MECHANISM.

1,064,213.  Specification of Letters Patent.  Patented June 10, 1913.

Application filed January 9, 1911. Serial No. 601,754.

*To all whom it may concern:*

Be it known that I, REINHOLD HERMAN, a citizen of the United States of America, residing at Crafton, in the county of Allegheny and State of Pennsylvania, have invented certain new and useful Improvements in Supporting Means for Transmission Mechanism, of which the following is a specification.

My invention relates to improvements in supporting means for transmission mechanisms, and has particular relation to structures adapted to provide for variations in the alinement of shafts adapted to be driven one from the other.

The present invention is designed mainly for use in connection with automobile or motor vehicle structures, the driven shaft acting the part of the axle of such vehicle, but it is to be understood that I do not limit myself to this particular use, since the structure and arrangement of parts is such as will permit its use in other connections; for instance, where used in connection with motor vehicles the driven shaft would have the direction of length of its shaft lines at approximate right angles to the direction of length of the drive shaft line, whereas a change in gear structure will permit of an arrangement of the parts so as to provide for the operative connection of shafts having their shaft lines extending in the same general direction, either in coincidence, in parallelism, or angular with respect to each other. As the structure however, is intended for use in connection with motor vehicles, I have herein described it in connection with such vehicles, this forming the best exemplification now known to me of its use.

In motor vehicle structures, the axle, which forms the driven shaft, is generally connected to the motor by means of universal joints, a transmission mechanism and a propeller shaft which extends from the axle and is coupled by means of a universal joint to the divided shaft of the transmission mechanism, the latter being bolted to the frame of the vehicle; the other portion of the divided shaft is coupled to the clutch of the fly wheel of the motor by means of another universal joint. It will be noted that in order to make use of the different reductions of gears for the purpose of obtaining the proper compounding of power, there is necessitated the use of a number of journals and disconnected elements which introduce an enormous amount of friction or loss of power, in addition to which the up-keep of all these parts provides a source of considerable expense to the user; such construction also has the effect of creating a great deal of noise in use forming an annoyance not only to the occupants of the vehicle but also to the general public. In such type of drive connections, one difficulty lies in the fact that the shaft line must correspond with the line extending from the axle to the motor and provision is made through the use of universal joints or the like for providing the connections where it is not possible to make such direct shaft lines; under such conditions any attempt to change the shaft lines, as where it is desired to shift the position of the motor vertically, can only be obtained by substantially disassembling the connections, etc., re-arrange the parts to provide for the new alinement, and then secure them in their new position.

In the present invention I provide supporting means for the transmission mechanism so arranged as to eliminate the use of divided shafts, or coupling counter parts and journals which support the same, and all other adjuncts thereto required in its operation; I also eliminate the employment of a structure in which the counter shaft remains an idle element when the drive and driven shafts are operatively connected. Furthermore, I provide a structure in which the gearing and other operative elements of the transmission mechanism are at all times positioned to permit operation through the normal service operations, and at the same time permit parallel, alined or angular adjustments of the drive and driven shafts relative to each other as may be required to meet various conditions or uses, there being no necessity for changing, either by the addition or elimination of any part of the same to provide these adjustments; the construction being such that the driven shaft and its housing are at all times retained in their original positions.

Among the objects of my invention therefore, are the following: (1) to provide a supporting means for the transmission mechanism supported on the axle and arranged to form a support for the chassis; (2) the provision of a supporting means arranged to permit variations in shaft line positions of the drive shaft without requiring disengagement of the transmission mechanism; (3) the provision of a supporting means arranged to receive the drive shaft, the driven shaft and all operative connections therebetween and to provide for relative movements of connecting supporting structures to permit adjustment of the means and retain the relative arrangement of the connections while being adjusted; (4) to provide a supporting means in which one member is held in fixed position and in which other members are adjustable relative to certain members to affect the drive shaft line position without affecting the transmission connections between the drive and driven shafts; (5) to provide a supporting means arranged to form anti-friction bearings for each of the main shafts therein and to provide for adjustment of said bearings to take up for wear of parts coöperating with the shafts.

Other and further objects of the invention are to provide a structure of this character which is compact and occupies a position at a point where it will materially increase the road clearance of the vehicle, which is durable in construction, easily accessible, requires a minimum of repairs, is readily assembled, which can be manufactured at a relatively low cost, and which can be applied universally to all types of motor vehicles.

With the above and other objects in view, the invention resides in the novel construction, combination and arrangement of parts of which an embodiment is shown in the accompanying drawings, wherein like numerals are used to designate like parts throughout the different views, in which:—

Figure 1 is a side elevation of so much of a motor vehicle as is necessary to illustrate the subject matter of the present invention, the view showing several adjustments of the motor. Fig. 2 is an enlarged side elevation of the casing forming the supporting means for the transmission, said view showing various adjustments of the casing to provide for drive shaft line position changes. Fig. 3 is a top plan view of the parts shown in Fig. 2. Fig. 4 is a sectional view taken on line 4—4, Fig. 2. Fig. 5 is a sectional view on line 5—5 of Fig. 4. Fig. 6 is a similar view taken on line 6—6 of Fig. 4, looking toward the left. Fig. 7 is a sectional view on the same line of said Fig. 4, looking toward the right.

In the drawings, 20 designates the axle or driven shaft of a motor vehicle, 21 the chassis, 22 the springs supporting the chassis, 23 the motor, 24 the drive shaft, 25 the supporting means for the transmission mechanism and 26 the transmitting connections between the drive and driven shafts.

As will be seen by reference to Fig. 1, the supporting means 25 is mounted on the axle and in turn supports the springs 22 on which are mounted the chassis 21, this construction providing the direct support of the chassis on the transmission supporting means instead of directly on the axle, thereby permitting of the use of anti-friction devices between the parts supported by the axle and the axle itself and eliminating the effects of the chassis weight to a considerable degree by reason of the fact that the weight is applied at diversified points instead of at a single point at each side of the axle. Furthermore, as shown in Fig. 4 this arrangement permits of the employment of the supporting means for the chassis as a lubricant container enabling a distribution of the lubricant throughout substantially the length of the axle and providing additional space for the lubricant, augmenting the supply carried within the main portion of the supporting means for the transmission mechanism. The supporting means, shown herein as a casing, is formed of main supporting members 27 adapted to form a portion of the ends of the casing, said members each having its inner end formed with a peripheral face 28 preferably concentric to the driven shaft or axle on which the members are mounted, said faces forming a seat for a casing closure 29 carried by a section 30 of a second member 31, the latter member being completed by a section 32 secured to the section 30, the casing being completed by a third member 33 secured to the section 32, the three members providing a casing for the entire gear transmission mechanism, the drive shaft 24 extending into the third member 33 and being provided with a drive pinion 24ª located within said member.

As shown in Fig. 4, the main supporting member 27 is provided with an elongated sleeve-like portion 34 of a length to extend beyond the spring support 35 which is secured thereto, and terminates in a casing to receive a ball-race 36 forming with the complemental cone carried by the shaft, an anti-friction bearing 37. The inner end of said member is also provided with an anti-friction bearing 38, these two bearings being placed approximately at the opposite ends of each member 27 and at points spaced from the spring supports, thereby placing the weight of the chassis on the axle at two points on each side of the transmission, these points being spaced apart a distance sufficient to cause the strain to be diversified. As will be seen, the inner cones of the bearings 38 are carried directly by the shaft 20, the latter carrying suitable abutments against which said cones are positioned, said abutments, with the cone members forming stops which prevent relative movements of the shaft or axle 20 and the casing 25, thereby insuring a fixed position of the casing on the axle regardless of pressures which may be placed on the axle in use, such as may be provided by skidding, and which pressures are exerted longitudinally of the axle. The section 30, as heretofore pointed out, is formed with the casing closure 29, that portion of the cylinder connected to the remainder of the section being cut away to provide for the transmission gearing. The remainder of the section 30, is shaped to provide a proper cavity for the reception of gearing, and said section is secured to the members 27 by having the annular seat of these members inserted within the cylindrical portion of the casing 29, the members 27 then being connected together by bolts 39 passing through suitable ears carried by the members.

As will be readily understood, a tightening of the bolts 39 will cause a frictional holding of the section 30 sufficient to prevent relative movement of said section on the members 27, but that a loosening of the bolts 39 to destroy such frictional engagement, will permit the section 30 to be rotated about the members without change in the axis of the cylindrical portion of the section, the concentric seat of the members providing for this movement of the section without affecting the axis of either the members 27 or the section 30. As the section 30 carries the remaining portions of the supporting means, it will be obvious that a pivotal movement of said section on the concentric seat will permit of a movement of all of the supporting means with the exception of the members 27 with the driven shaft or axle as the axis of rotation, thereby permitting of a variation in angularity of the drive shaft line to the body of the chassis without affecting the position of the supporting means with respect to the axle and without decreasing the road clearance below the axle, since that portion of the structure which would be located below the plane of the axle would be of the same configuration during any variation which would be employed in making a change of adjustment in connection with an automobile or motor vehicle.

The second member 31 is completed by the section 32 which is bolted to the section 30 by suitable bolts 40, said sections having flanges for the reception of the bolts. The section 32 is of any desired peripheral configuration, but I prefer to form said section with an approximately semi-circular configuration, since the outer face of said section is formed to provide a seat on which the third member 33 moves to provide for an additional adjustment between the members through the adjustment of the third member on the second.

The interior of the section 32 is properly formed to receive the transmission gearing, and in this connection, I prefer to employ as a part of such transmission gearing, a shaft 41 positioned substantially axial of the main portion of the second member, the structure being such that the two sections 30 and 32 divide so as to permit of the placing of this shaft in position prior to the assembling of the sections. As shown in Fig. 4, the shaft 41 is mounted in anti-friction bearings 41ª held by straps 41ᵇ secured to section 32 by bolts 41ᶜ (Fig. 3), and is also provided with the bevel gear 42 which, as presently described, connects with the drive shaft to form the permanent driving means for the transmission.

If desired, and such construction is preferred, I may provide for adjustment of the shaft 41 longitudinally to take up wear of the gears, etc., by employing a suitable cap 43 adapted for screw-threaded engagement with the sections 30 and 32, said caps abutting against the race-way for the anti-friction bearings and permitting adjustment of the bearings relative to the member and thereby provide for longitudinal adjustment of said shaft 41.

The third member 33, which may be termed the horn, projects outwardly from, and is secured to the section 32, said horn having its axis extending on a line corresponding to a radial line of the second member, the axis of the latter corresponding to the position of the shaft 41. The third member or horn is preferably mounted for pivotal movement on the second member, with the shaft 41 as the axis, the section 32 being provided with a seat 44, of sufficient length to permit a considerable length of pivotal movement of the horn, the latter being provided with a structure complemental to the seat to permit such pivotal movement without liability of the escape of the lubricant contained within the supporting means. For the purpose of securing the horn to the section 32, I provide the horn member with segmental flanges 45 adapted to overlie side faces of the section 32, the flanges 45 being provided with an elongated slot 46 through which bolts 47 are adapted to pass and be secured in openings formed in the section 32, the structure being such that a tightening of the bolts 47 will retain the horn and second section against relative movement, while a loosening of said bolts will permit the horn to move pivotally on said section 32 within the limits of movement of the horn on the second member to provide for a variation in angularity of the axis of the horn relative to the driven shaft line, a tightening of the bolts 47 after adjustment again securing the second and third members against relative pivotal movement. The third member or horn forms the bearing for the end of the drive shaft, the latter extending through the horn and having its inner end provided with a pinion 24ª adapted to permanently mesh with the gear 42, said horn being provided with anti-friction bearings, as shown, for the drive shaft, the bearing at the end of the horn being preferably formed to permit adjustment of the drive shaft relative to the horn in the direction of length of the shaft to take up for wear of the pinion 24ª. By this construction, it will be seen that various adjustments may be made in the supporting means for the transmission mechanism to meet varying conditions of service. Several of these adjustments are shown in Fig. 2. In said figure, the dotted line position indicated as A is provided by loosening the bolts 39 and moving the second and third members pivotally as a unit, this change retaining the angularity of drive shaft axis to the axis of the driven shaft but changing the angularity of the axis of the drive shaft with respect to the chassis. Upon tightening of the said bolts 39, the parts will be retained in this position. If the bolts 47 then are loosened, the horn or third member may be swung pivotally to the dotted line position indicated as B, this restoring the angularity of the drive shaft with respect to the chassis, but providing a variation in the angularity of the drive shaft axis relative to the axis of the driven shaft.

It will be understood, of course, that the positions shown in Fig. 2 are illustrative only, the particular arrangement providing for any desired variation in adjustments throughout the range of pivotal movement, the arrangement of the parts for pivotal movement on two different centers spaced apart providing for nicety and accuracy of adjustment without any requirement of disassembling, the adjustment being possible without affecting the lubricant contained therein, the only requirement being a loosening of the bolts sufficient to free the frictional engagement of the parts and permit them to be moved on their axes, such movements being made while the parts retain their relative positions, the bolts being again tightened after the proper adjustment is had.

In Fig. 1, I show several of the different adjustments with the drive or propeller shaft and motor in the positions assumed by them after adjustment. As will be readily understood from this figure, there is produced an advantage of the highest degree, viz., the ability to vary the height of the drive or propeller shaft within the capacity of the mechanism to permit said shaft to conform with the crank shaft of the motor. The ability to change the height of the drive or propeller shaft so as to raise it far above the center of the axle or driven shaft enables the fly wheel of the motor to be raised to the highest point possible, thereby securing a maximum clearance between the road and the fly wheel without disturbing the straight line drive connection between the axle and the motor, it being readily understood that an increase of road clearance by a raising of the motor fly wheel, even if of relatively small amount, is of vital advantage in the operation of motor vehicles.

The particular type of transmission gearing employed in connection with the supporting means heretofore described is material only in so far that I prefer to employ the bevel gear drive between the drive shaft and shaft 41, in order that the horn may have its pivotal movement without disengaging the pinion 24ª and gear 42. The particular type of gear connection between the shaft 41 and the driven shaft is not material, since it is to be understood that the drive gears of the change speed mechanism are carried by the shaft 41 and the driven gears by the driven shaft, and such drive and driven gears are generally of a type which will permit of a rolling of the drive gears on the driven gears when placed within the supporting means herein described. In the drawings, I have disclosed one form in which such transmission gearing may be provided, the structure being of the selective change-speed type. As shown, I place a differential mechanism 49 on the driven shaft, said mechanism having gears 50 and 51 of different diameters, and spaced apart a distance sufficient to permit of the movement of a selecting gear 52, on the shaft 41, these parts being located on one side of the gear 42. On the opposite side of said gear 42, I show the slow-speed gear 53 mounted on the carrier for the differential mechanism, a suitable reversing gear structure embodying gears 54ª and 54ᵇ mounted on a stub shaft 54 carried in bearings formed in the section 32, and a selecting gear 55 carried by the shaft 41, the arrangement being such that movements of the selecting gears 52 and 55 longitudinally of the shaft 41 will provide a selective drive engagement between shafts 41 and 20.

To provide the shifting movements for the gears 52 and 55, I show a structure embodying a bar 56 adapted to move in a direction parallel to the axis of the shaft 41, said bar having a laterally-extending member engaging the selecting gear, said bar being movable through the movements of an angle lever 57 operatively connected to a controlling device (not shown), the bar preferably being provided with notches or recesses to receive a spring-pressed plunger for the purpose of retaining the bar against a free longitudinal movement, this construction being of a well known type. It is to be understood that a separate operating device is preferably employed with each of the gears 52 and 55. As shown in Fig. 2, the support for the lever 57 is carried by a plate 58 surrounding the axis of the bar 56, said plate being provided with segmental slots 59 through which adjusting screws 60 are adapted to pass, this construction permitting a shifting of the lever support to accommodate for required adjustments in connecting up the mechanism or in meeting changed conditions arising from the adjustment of the members heretofore described.

As will be readily understood, the structure of supporting means herein disclosed is such as to provide for a number of material advantages in transmission mechanisms. Among these are to be found:—(1) the placing of the drive strain directly on the shaft 41 and indirectly on the driven shaft through the spur gear connection between said shafts instead of directly upon the drive shaft as in the general type of transmission mechanisms; (2) the provision of a supporting means adapted to carry the transmission gearing and mounted on the driven shaft and capable of substantially universal adjustment to provide a proper connection with the motor, enables the assembling of the motor drive connections at greatly decreased expense and with greater rapidity; (3) the particular structural form of the supporting means which permits of a ready taking down of the structure for the purpose of inspection and maintenance; (4) the ability to change the entire form of transmission on motor vehicles now in use with but small expense, the type of structure herein disclosed being especially adaptable to mounting on all types of motor driven vehicles.

As heretofore pointed out, the transmission mechanism is of any approved type, so long as it contains the elements referred to heretofore, but I prefer to employ mechanism of the type disclosed in my copending companion application filed January 9, 1911, Serial No. 601,758, wherein the gears providing for speed selection have a neutral position intermediate the gears carried by the driven shaft, one form of which is disclosed in Fig. 4 herein. It is to be understood of course that the axle or driven shaft is in the form of a divided structure, the differential 49 coöperating with the parts of the shaft to permit the relative movements of the vehicle wheels in use. By providing a neutral position for the selecting gears, in which position the driven shaft gears are entirely disconnected from any of the drive portion of the mechanism, the friction provided by the use of contacting gears, as in the general type of transmission mechanisms, is eliminated, the axle running free except when a selecting gear has operatively-connected the drive and driven shafts. And since the only connection between the constantly driven shaft 41 with its bevel gear and the driven shaft is through the selecting gears 52 or 55, it will be clear that when said gears are in neutral position not only will the driven shaft be entirely disconnected from the drive connections and therefore free to move (as when drifting), but in addition, the friction which would be placed on the bevel gears by a contact of the driven shaft gears with the gears carried by the constantly driven shaft is eliminated, so that the wear and tear of the constantly driven connections and their bearings is reduced to a minimum. By this construction it will be obvious that the ability to entirely disconnect the constantly-driven shaft and the driven shaft in such manner that the gears carried by these respective shafts are out of contact with one another, provides a freedom of operation sufficient to increase the running qualities of the vehicle. This is especially true when the vehicle is "drifting," the freedom from friction permitting the vehicle to run free.

As heretofore stated, and as herein disclosed, the structure is particularly designed for use in connection with motor vehicles, but as will be readily understood, the general principles involved in the structure are such as will enable it to be employed in other connections where it is desired to provide a transmission of power from one shaft to another; and while the disclosure is such as to provide for the transmission of power between shafts having their shaft lines at right angles, through the bevel gear connections shown, the idea may be employed in connection with shafts which are not angular in this respect, by a change in the form of gear connection and such modification as may be necessary to provide for the entrance of the driven shaft into the supporting means; such variations in the general ideas disclosed herein and the use, are contemplated by the present invention, and I therefore desire it to be understood that I reserve the right to make any and all such changes and modifications therein as conditions may require, so far as they fall within the spirit and scope of the invention as expressed in the appended claims.

Having thus described my invention, what I claim as new, is:

1. In a motor vehicle, an internal combustion motor, a drive shaft adapted to be coupled thereto, a driven shaft, transmission mechanism for operatively connecting said shafts at will, and means for supporting the transmission mechanism on the driven shaft, said drive shaft extending into the supporting means, said transmission mechanism including a gear-carrying shaft having a member fixed thereto and permanently movable with the drive shaft; said member being out of axial alinement with both of said shafts, the axis of said member being spaced a constant distance from the axis of the driven shaft.

2. In a motor vehicle, an internal combustion motor, a drive shaft adapted to be coupled to said motor, a driven shaft, said shafts extending angularly to each other, change speed transmission mechanism for operatively connecting said shafts at will, and means for pivotally supporting the transmission mechanism on the driven shaft, said drive shaft extending into the supporting means, said transmission mechanism including a gear-carrying shaft having a member fixed thereto and permanently movable with the drive shaft, said member being out of axial alinement with both of said shafts, the axis of said member being spaced a constant distance from the axis of the driven shaft.

3. In a motor vehicle, an internal combustion motor, a drive shaft adapted to be coupled to said motor, a driven shaft, said shafts extending angularly to each other, change speed transmission mechanism for operatively connecting said shafts at will, and means for pivotally and adjustably supporting the transmission mechanism on the driven shaft, said drive shaft extending into the supporting means, said transmission mechanism including a gear-carrying shaft having a member fixed thereto and permanently movable with the drive shaft, said member being out of axial alinement with both of said shafts, the axis of said member being spaced a constant distance from the axis of the driven shaft.

4. In a motor vehicle, an internal combustion motor, a drive shaft adapted to be coupled to said motor, a driven shaft, said shafts extending angularly to each other, change speed transmission mechanism for operatively connecting said shafts at will, and means for pivotally supporting the transmission mechanism on the driven shaft, said means permitting variations in shaft line positions without affecting the normal operative relationship between the parts.

5. In a motor vehicle, an internal combustion motor, a drive shaft adapted to be coupled thereto, a driven shaft, transmission mechanism for operatively connecting said shafts at will, and means for supporting the transmission mechanism on the driven shaft, said drive shaft extending into the supporting means, said transmission mechanism including a gear-carrying shaft having a member fixed thereto and permanently movable with the drive shaft, said member being out of axial alinement with both of said shafts, the axis of said member being spaced a constant distance from the axis of the driven shaft and constantly intersecting the axis of the drive shaft.

6. In a motor vehicle, an internal combustion motor, a drive shaft adapted to be coupled to said motor, a driven shaft, said shafts extending angularly to each other, transmission mechanism for operatively connecting said shafts at will, and a supporting element for the transmission mechanism, said element being supported by the driven shaft and mounted for adjustable pivotal movement thereon independent of the motor.

7. In combination, a drive shaft, a driven shaft, transmission mechanism for operatively connecting said shafts, and a supporting element for the transmission mechanism, said element being mounted on and supported by said driven shaft, said element comprising a plurality of members pivotally and adjustably connected together with movements on prescribed axes, whereby adjustment in the shaft lines of the drive shaft may be provided without affecting the normal operative relationship of the transmission mechanism between the shafts.

8. In a motor vehicle, a drive shaft, an axle, change speed mechanism between said shaft and axle to operatively connect said parts at will, said mechanism including an intermediate shaft extending parallel with the axle and movable solely in a pivotal direction, and a supporting element carried by the axle and supporting the change speed mechanism, said drive shaft extending into said element, said element comprising a casing having bearings for the axle, the intermediate shaft and for the drive shaft, the axis of the bearings for the intermediate shaft being spaced a constant distance from the axle.

9. In combination, a drive shaft, a driven shaft, said shafts extending angularly to each other, change-speed transmission mechanism for operatively connecting said shafts, and a supporting element for operating said mechanism and into which the drive shaft extends for the transmission mechanism, said supporting element being adjustable pivotally with respect to the driven shaft to provide variations in shaft line positions of the drive shaft without affecting the normal operative relationship of the operating parts.

10. The combination with transmission-connected shafts extending angularly with respect to each other, of a supporting element for the transmission connections, said element comprising a plurality of members supported by one of the shafts and complementally formed to permit articulation of the members to provide for adjustable variations in the shaft line positions of the shafts relative to each other without affecting the normal operative relationship between the parts.

11. The combination with transmission-connected shafts extending angularly with respect to each other, of a supporting element for the transmission connections, said element comprising a plurality of members supported by one of the shafts and complementally formed to permit articulation of the members to provide for adjustable variations in the shaft line positions of the shafts relative to each other without affecting the normal operative relationship between the parts, the articulation providing for pivotal movements on parallel axes.

12. The combination with transmission-connected shafts, of a supporting element for the transmission connections, said element comprising a plurality of members supported by one of the shafts and complementally formed to permit articulation of the members to provide for adjustable variations in the shaft line positions of the shafts relative to each other without affecting the normal operative relationship between the parts, said articulation providing for independent pivotal adjustments of the members relative to each other.

13. The combination with transmission-connected shafts, of a supporting element for the transmission connections, said element comprising a plurality of members supported by one of the shafts and complementally formed to permit articulation of the members to provide for adjustable variations in the shaft line positions of the shafts relative to each other without affecting the normal operative relationship between the parts, said articulation providing for independent pivotal adjustments of the members relative to each other, one of said members having a fixed position relative to the driven shaft.

14. The combination with transmission-connected shafts, of a supporting element for the transmission connections, said element comprising a plurality of members supported by one of the shafts and complementally formed to permit articulation of the members to provide for adjustable variations in the shaft line positions of the shafts relative to each other without affecting the normal operative relationship between the parts, said articulation providing for independent pivotal adjustments of the members relative to each other, one of said members having a fixed position relative to the driven shaft, the adjustments of the remaining members being on axes coincident with or parallel to the axis of the driven shaft.

15. The combination with transmission-connected shafts, of a supporting element for the transmission connections and into which the drive shaft extends, said element being supported by the driven shaft and comprising a plurality of members connected together to permit articulation of the members without affecting the normal operative relationship of the transmission mechanism and the shafts, one of said members having a relatively fixed position on the driven shaft and forming the support for a second member, the supporting connections providing for a pivotal movement between said members with the driven shaft forming the axis for both members.

16. The combination with transmission-connected shafts, of a supporting element for the transmission connections and into which the drive shaft extends, said element being supported by the driven shaft and comprising a plurality of members connected together to permit articulation of the members without affecting the normal operative relationship of the transmission mechanism and the shafts, one of said members having a relatively fixed position on the driven shaft and forming the support for a second member, the supporting connections providing for a pivotal movement between said members with the driven shaft forming the axis for both members, a third member being pivotally adjustable with respect to the second member, the axis of pivotal movement of the third member extending on a plane parallel to the axis of the other member.

17. The combination with transmission-connected shafts, of a supporting element for the transmission connections and into which the drive shaft extends, said element being supported by the driven shaft and comprising a plurality of members connected together to permit articulation of the members without affecting the normal operative relationship of the transmission mechanism and the shafts, one of said members having a relatively fixed position on the driven shaft and forming the support for a second member, the supporting connections providing for a pivotal movement between said members with the driven shaft forming the axis for both members, a third member being pivotally adjustable with respect to the second member, the axis of pivotal movement of the third member extending on a plane parallel to the axis of the other member, the second member being formed in two parts connected together and having the dividing line extending through the axis for the third member.

18. In combination, a drive shaft, a driven shaft, transmission mechanism between said shafts, said mechanisms including a shaft in constant drive connection with the drive shaft, and a supporting element for said transmission mechanism, said element being mounted on the driven shaft and formed of a plurality of members connected together for articulating adjustments to vary the shaft line positions of the drive shaft with respect to the driven shaft, one of said members having means to adjust the constantly driven shaft axially to take up for wear of the operative connections between the drive and the constantly driven shafts.

19. In a motor vehicle, a drive shaft, an axle, change speed mechanism between said shaft and axle to operatively connect said parts at will, a supporting element carried by the axle and supporting the change speed mechanism, said drive shaft extending into said element, and bearings between said element and the axle and positioned to prevent relative longitudinal movement between the axle and the element provided by pressure longitudinally of the axle.

20. In a motor vehicle, the combination of a motor-driven drive shaft, a driven axle, transmission mechanism between the drive shaft and said axle, and a supporting element for the transmission mechanism and into which the drive shaft leads, said element forming a support for the chassis of the vehicle, said element comprising a plurality of members connected for articulation to provide variations in shaft line positions of the drive shaft with respect to the axle without affecting the normal operative relationship of the operating parts and of the chassis.

21. In a motor vehicle, a drive shaft, an axle, change speed mechanism between said shaft and axle to operatively connect said parts at will, a supporting element carried by the axle and supporting the change speed mechanism, said drive shaft extending into said element, and bearings between said element and the axle and positioned to prevent relative longitudinal movement between the axle and the element provided by pressure longitudinally of the axle, said bearings including members carried respectively by the axle and element, said axle having abutments within the elements co-acting with the axle members to form stops in opposition to relative movements of the element and axle in opposite directions.

22. In a motor vehicle having a live axle, a motor and its supporting frame, change speed transmission mechanism, a transmission mechanism support mounted on the live axle, and a drive shaft leading into said support and having means within said support for driving the transmission mechanism, said shaft being operatively connected to the motor and having the line of its axis substantially continuous in a single plane, said support having means to permit shifting of such line of axis to locate the shaft line in either one of a plurality of planes.

23. In a motor vehicle having a live axle, a motor and its supporting frame, change speed transmission mechanism, a transmission mechanism support mounted on the live axle, and a drive shaft leading into said support and having means within said support for driving the transmission mechanism, said shaft being operatively connected to the motor and having the line of its axis substantially continuous in a single plane, said support having means to permit shifting of such line of axis to locate the shaft line in either one of a plurality of parallel planes.

In testimony whereof I affix my signature in presence of two witnesses.

REINHOLD HERMAN.

Witnesses:
A. M. WILSON,
HORACE G. SEITZ.